(12) United States Patent
Greenberg (10) Patent No.: US 7,402,543 B1
(45) Date of Patent: Jul. 22, 2008

(54) DECORATIVE REFRACTORY TILE AND METHOD OF USE

(76) Inventor: Ruth Frances Greenberg, 2816 SE. 41st Ave., Portland, OR (US) 97202

( * ) Notice: Subject to any disclaimer, the term of this patent is extended or adjusted under 35 U.S.C. 154(b) by 664 days.

(21) Appl. No.: 11/027,883

(22) Filed: Dec. 29, 2004

Related U.S. Application Data (60) Provisional application No. 60/609,596, filed on Sep. 13, 2004.

(51) Int. Cl.
C04B 33/04 (2006.01)
(52) U.S. Cl. .................. 501/141; 501/130; 501/142; 501/143; 501/144
(58) Field of Classification Search .................. 501/130, 501/141, 142, 143, 144; 264/678, 680; 428/432, 428/427
See application file for complete search history.

(56) References Cited

U.S. PATENT DOCUMENTS 3,348,957 A * 10/1967 Chaklader et al. ........... 501/127
5,695,712 A * 12/1997 Kumar et al. ............... 264/655
6,824,877 B1 * 11/2004 Groth ......................... 428/432
6,893,725 B2 * 5/2005 Hayashi et al. ............. 428/432
6,919,289 B1 * 7/2005 Parker ........................ 501/141

* cited by examiner

Primary Examiner—Karl E Group
(74) Attorney, Agent, or Firm—Mark S. Hubert

(57) ABSTRACT

The present invention relates to a decorative refractory tile and it's method of use. This decorative tile utilizes a specially formulated clay body that undergoes dehydration and vitrification by firing in a specific manner with respect to temperature, time and rate of temperature increase. This thin, refractory tile has a high thermal conductivity, high structural strength able to maintain a minimal of cracking, distortion and spalling under rapid temperature changes and possesses a high resistance to erosion from ash-laden gases encountered in a conventional fireplace.

This tile can be colored with heat resistant glazes, stains and oxides and sized or shaped within certain dimensional ranges, so as allow it to present patterns, designs or even pictures on the sides, floor and back of the firebox.

When this tile is crafted by one with an artistic flair, and affixed to the walls, floor or sides of a firebox, aesthetically favorable fireplaces can be created.

12 Claims, 6 Drawing Sheets

DECORATIVE REFRACTORY TILE AND METHOD OF USE

BACKGROUND OF THE INVENTION

The present invention relates to a decorative refractory tile and it's method of use.

Fireplaces are commonplace in North American homes. However, the majority of fireplaces are not used to consistently provide a source of heat for the building. Most are used as a decorative addition to the building and are occasionally used as a source of "mood" lighting and heating. Conventional fireboxes (the interior cavity of a fireplace) see temperatures in the range of 1000-1200° F., and as such are built and lined with a special refractory brick. This brick is able to withstand these temperatures with a minimal of cracking, distortion and spalling under rapid temperature change, and it's structural strength must hold up well under rapid temperature changes. Refractory brick has the highest thermal conductivities of bricks. It possesses a high resistance to erosion from ash-laden gases and to the fluxing action of molten slag.

The standard size of fire-brick is 9×4.5×2.5 in. Although it can be glazed, it is an uncommon practice in the industry. Therein lies the problem—aesthetics. In an upper end home or commercial structure, the lavish surroundings do not aesthetically blend well with a huge visible wall section primarily composed of uniform brick. Simply stated, the demanding consumer of today wants more.

This new decorative tile utilizes a specially formulated clay body that undergoes dehydration and vitrification by firing in a specific manner with respect to temperature, time and rate of temperature increase, to yield a thin, refractory tile that has the ability, to withstand the temperatures encountered in a conventional firebox or fireplace. This tile can be sized and shaped within certain dimensional ranges, so as allow them to present patterns, designs or even pictures on the sides, floor and back of the firebox. It can be colored with heat resistant glazes, stains and oxides.

Such refractory tile allows owners of both closed and open fireplaces, to line the refractory brick interior of their fireboxes with a decorative tile. This tile is set into place in much the same manner as traditional tiles are set with the exception that they must be affixed to the brick using special refractory mortars. When this tile is crafted by one with an artistic flair, aesthetically favorable fireboxes can be created thereby overcoming the abovementioned drawbacks.

SUMMARY OF THE INVENTION

In accordance with the invention, an object of the present invention is to provide a decorative refractive tile that can be affixed to a firebox to present an aesthetically appealing visual array. The general purpose of the present invention, which will be described subsequently in greater detail, is to provide a new method of making and using a refractive tile adapted for the lining of fireboxes, which is not anticipated, rendered obvious, suggested, or even implied by any of the prior art, either alone or in any combination thereof.

It is another object of this invention to provide a clay body formulation and method of firing that yields a refractory tile that can withstand rapid, extreme temperature changes, as would be encountered within a fireplace, without cracking or spalling.

It is a further object of this invention to provide a method of making and applying decorative refractory tile to a refractory brick lined firebox.

It is still a further object of this invention to provide for a refractive tile that can be shaped, colored and simply and economically fabricated.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Clay is finely crystalline, hydrous silicates formed from weathering of such silicate minerals as feldspar, pyroxene, and amphibole. Most common clay minerals belong to kaolinite, montmorillonite, and illite groups. Clay derives from the disintegration of granite and other feldspathic or pegmatite rocks, which as they decompose, deposit alumina and silica particles. Alumina and silica when combined with water form pure clay having the formulae $Al_2O_3 \cdot 2H_2O \cdot 2SiO_2$. Different characteristics are imparted by the addition of differing chemicals and the relative sizes of the constituents. Of particular interest to this invention are fireclays.

Fireclays are clays that are high in iron and capable of high temperature firing and have the ability of withstanding repeated thermal shock without cracking. They generally contain iron, calcium or feldspar and may also be high in flint, alumina, silica, or alumina and silica. Clay shrinkage generally ranges from 5 to 12 percent in the drying stage and another 8 to 12 percent in the firing. Overall most clays have a total shrinkage of 13 to 24 percent. Fireclays and the product described herein are not very plastic and thus have low shrinkage in the firing process due to the substitution of chemicals for some of the silica. They are highly refractory having a dense vitrification, and have a higher firing temperature range than most clay bodies. Generally they are course grained which improves the structural integrity.

Since this refractory tile is destined to be bonded to a refractory brick, it must possess many of the same physical qualities of refractory brick. They both must have a high resistance to erosion by ash-laden gases and to the fluxing action of molten slag, and cannot spall badly or crack under repeated rapid temperature changes. Both are baked in the kiln until partly vitrified. The tile is generally glazed so as to impart an aesthetic appeal.

Like a refractory brick, refractory tile is built mainly to withstand temperature. This does not usually accompany resistance to heat flow; in fact, this tile and refractory bricks have some of the highest thermal conductivities. This high thermal conductivity is the most important feature of refractory materials. The breaking or cracking of non refractory tiles is most commonly caused by thermally-related fractures caused by tensions within the mass of the tile. These fractures are caused by different degrees of dilation within the tile mass caused by the absorption of different amounts of heat by thermally non-conductive materials within the tile. Using a thermally conductive material for the refractory tile allows for more uniform heat absorption, thus allowing the tile to dilate uniformly and avoid the internal tensions which lead to fracture.

The decorative refractory tile of the present invention, is formed by thoroughly mixing 20-30% by weight of water with the following composition of dry powder of particles that have been sized to pass through a 200 BSS mesh. (ASTME Standard 11-61, or a 74 micron aperture) Note, the amount of water used is a matter of choice and is dictated by the desired workability of the clay body by the tile maker. There is no precise amount of water in this 20-30% range, nor is it relevant, as the water is driven out of the cut tile shapes during the elevated temperature period (firing) in the kiln. Generally, there is only a 3% variance in the relative percentages of the components of the clay body listed herein, however up to a 5% variance has shown to be tolerable for the fabrication of a proper refractory tile.

Dry Chemical Composition of Refractory Tile Base

| Component | Chemical Name (Common Name) | Weight % | Allowable Wt % Range |
|---|---|---|---|
| $Na_2O$ | Sodium Oxide (Soda) | 0.80 | .76-.84 |
| $K_2O$ | Potassium Oxide (Potash) | 1.12 | 1.064-1.176 |
| MgO | Magnesium Oxide (Magnesia) | 0.15 | 0.1425-0.1575 |
| CaO | Calcium Oxide (Quicklime) | 0.16 | 0.152-0.168 |
| $Al_2O_3$ | Aluminum Oxide (Alumia) | 28.52 | 27.094-29.946 |
| $Fe_2O_3$ | Ferric Oxide (Iron) | 1.11 | 1.0545-1.1655 |
| $SiO_2$ | Silicon Dioxide (Silica) | 66.8 | 63.46-70.14 |
| $TiO_2$ | Titanium Dioxide (Titania) | 0.79 | 0.7505-0.8295 |
| $P_2O_5$ | Phosphorus Pentoxide | 0.02 | 0.019-0.021 |
| Organic Impurities | Loss On Ignition Organics (LOI's) | 0.53 | 0.5035-0.5565 |
| Total | | 100 | |

The above chemical components are mixed with the appropriate amount of water (preferably 26%) in a pug mill, which uses mechanical fingers and pressure to create uniform consistency in the clay body. The pug mill also "wedges" the clay to eliminate air pockets. Once the above composition is thoroughly blended, the resultant mixture makes a clay body that can be dehydrated and vitrified in a kiln, with an 8% shrinkage, to form a refractory tile when formed and treated according to the following procedures.

Figures 1, 2, 3:
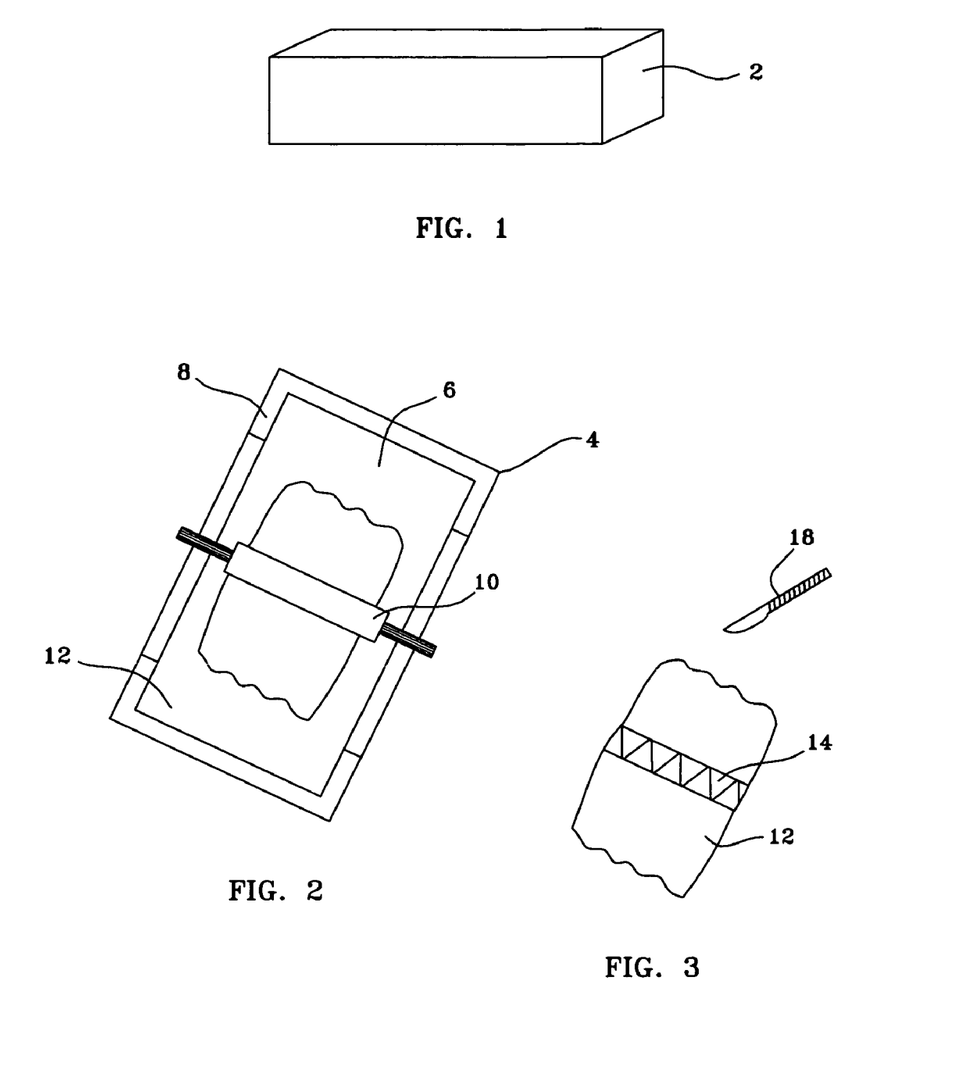
FIG. 1 is a front view of a moist clay body formed into a workable parallelepiped formation.
FIG. 2 is an top view of the clay body being flattened to a planar configuration in a thickness box.
FIG. 3 is a top view of the flattened, planar clay body being gut into geometric tiles.
Figure 4:
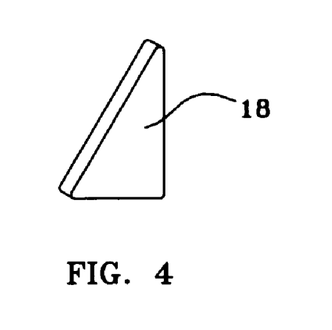
FIG. 4 is a perspective view of a triangular cut clay body.

First, once the clay body is mixed appropriately, it is formed into a workable parallelepiped formation 2. (Reference FIG. 1) Second, the clay body is cut into generally planar flakes with a wire tool and flattened in a thickness box 4 comprised of a planar bottom 6 bounded by uniform thickness exterior rails 8 over which a rolling pin 10 is worked until the clay body is of a uniform planar configuration 12 having a specified thickness. (Reference FIG. 2)

Since approximately 8% shrinkage in volume occurs during the firing process (with a 26% by weight water addition), allowance must be made to achieve the end desired thickness of tiles. The tiles can only be fabricated in certain ranges for both practical reasons such as shipping, and to maintain their refractive tile physical properties. Experimentation has shown that the desired range of finished tile thickness is between ¼ of an inch and ⅝ of an inch. The preferred range is ½ of an inch plus or minus 1/16 of an inch. (⅝ of an inch thick cut, wet tiles will shrink to between 5/16 and 7/16 in thickness, depending upon the geometric shape and the amount of water in the original clay body.) Below ¼ inch in thickness leads to a tile which is too fragile and unable to handle the repeated thermal shock encountered in a firebox.

Figure 7:
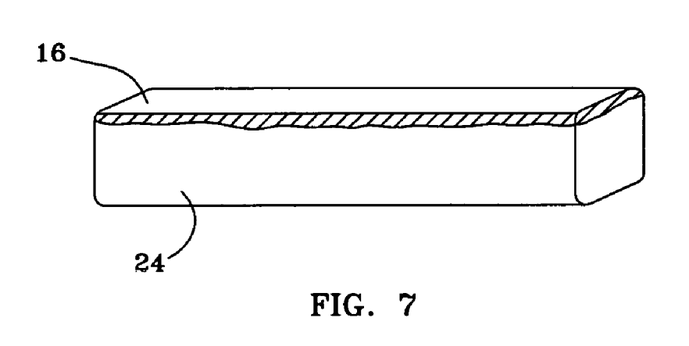
FIG. 7 is an side view of an elongate refractive tile that has a fused surface coating.
Figure 10:
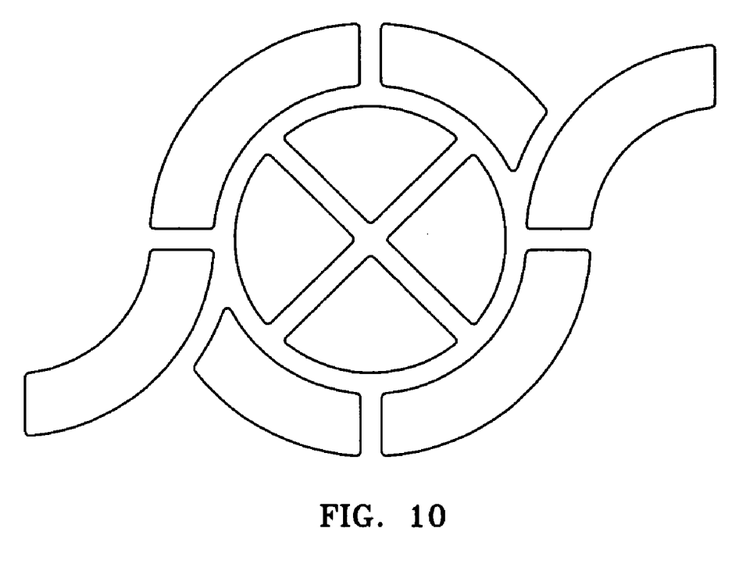
FIGS. 10-12 are front views of geometric pattern arrays into which the refractory tile can be arranged.
Figure 11:
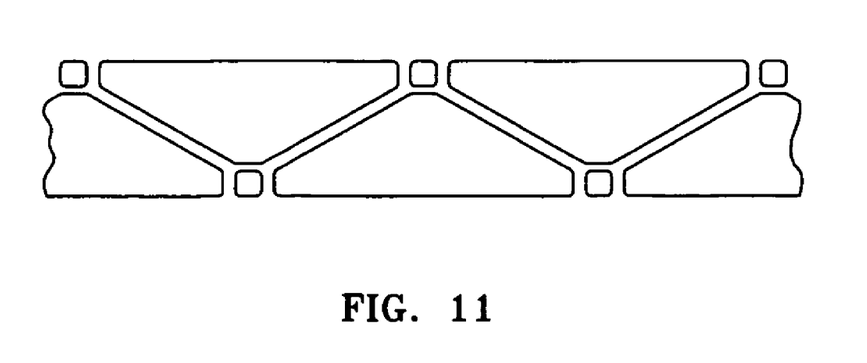
Figure 12:
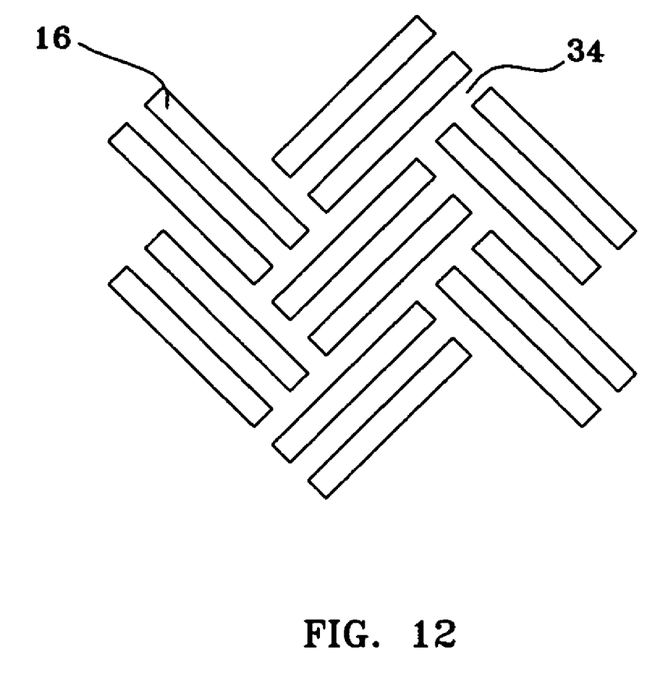

Similarly, the geometric shapes that the tiles are formed into are limited to certain dimensional sizes. Testing has shown that with the nominal ½ inch thick finished tiles, tiles made in the following dimensions are the most practical: ½ inch wide by 8 inch long; ½ inch by ½ inch square; 4 inches by 3 inches rectangular; and up to 5 inches in curved configuration. While it is possible to achieve larger sizes, these require specialized procedures and equipment. Such would be known to one skilled in the art. Typically, the geometric configurations are planned to form intricate pieces of such designs as illustrated in FIGS. 10, 11 and 12. A commonly used tile that has undergone extensive testing is elongate tile 24 (Reference FIG. 7) that can be used to form such aesthetically appealing patterns as illustrated in FIG. 12.

Figure 5:
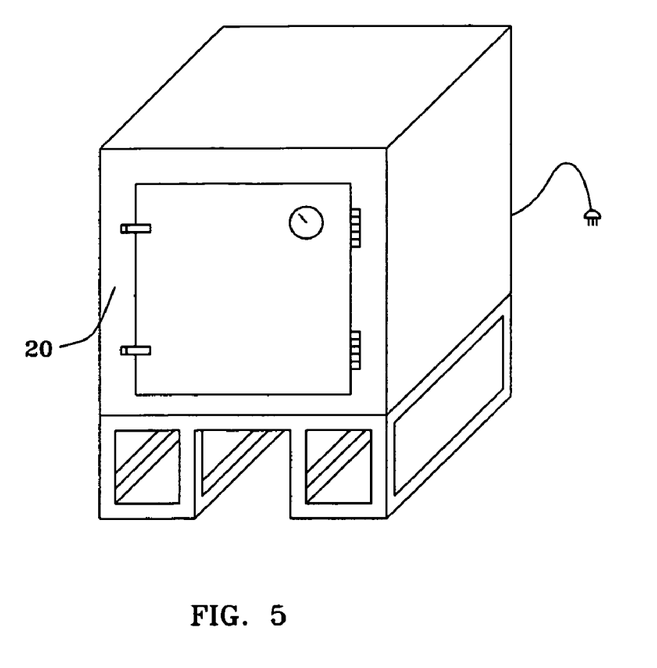
FIG. 5 is a front view of a firing kiln in which the tiles are dehydrated and vitrified.
Figure 6:
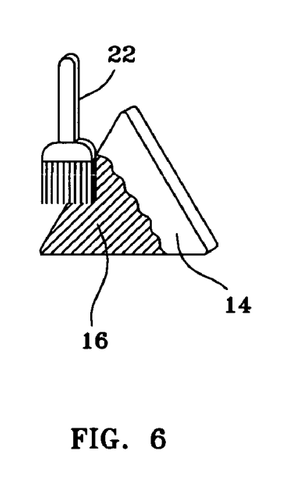
FIG. 6 is a front view showing the application of a color bearing surface coating onto a vitrified refractory tile.
Figure 13:
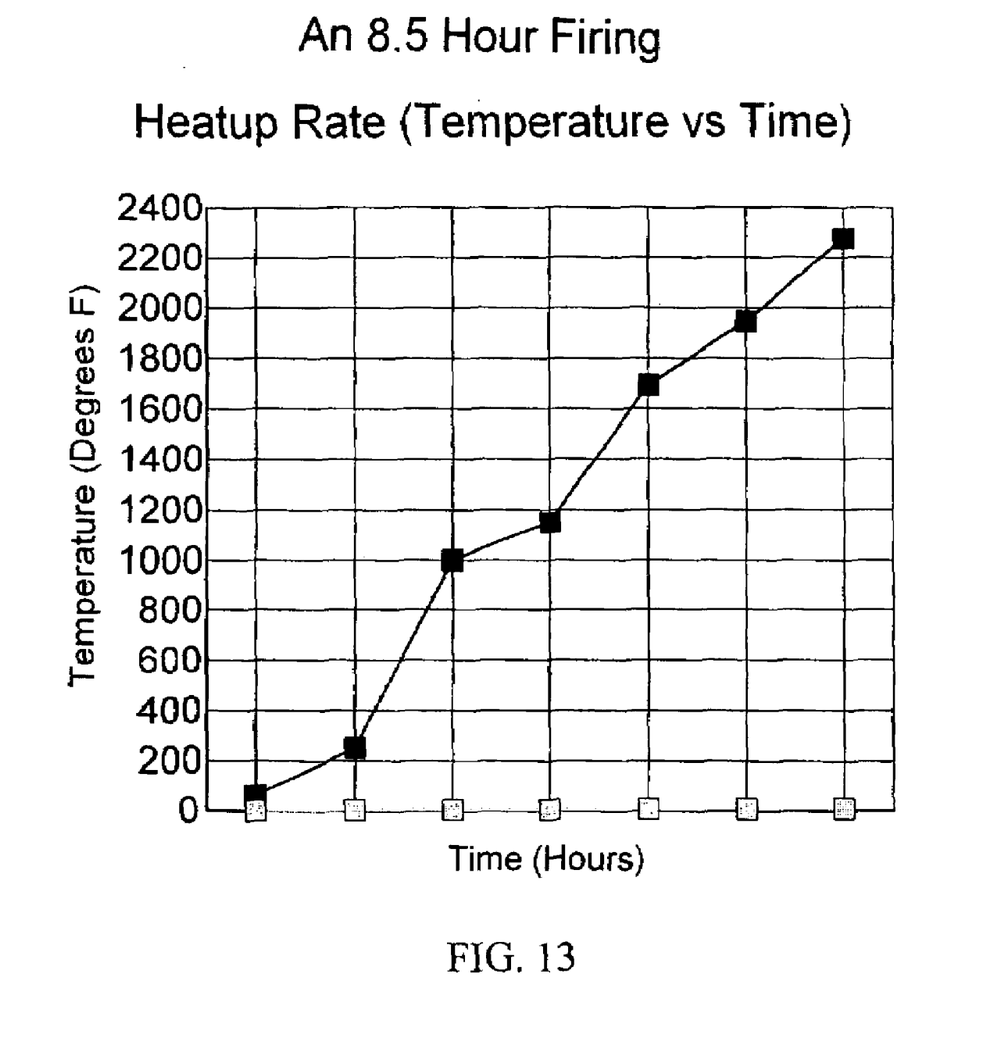
FIG. 13 is a chart depicting an 8.5 Hour Firing Heatup Rate (Temperature vs Time)

Once the clay body is brought to the desired thickness, a pattern is laid over the planar clay configuration 12 and the geometric shapes 14 are cut out with a cutting tool 18. (Reference FIG. 3. The edges of a cut tile are rounded 16 by hand to prevent later breaking or chipping and to impart aesthetic qualities. (Reference FIG. 7) The cut tiles are then put into a kiln 20 (Reference FIG. 5) that is eventually fired to between 2228° F. and 2273° F. (designated as Orton cone 7-8) following the heatup rate illustrated in FIG. 13. (The Orton series of cones is a reference scale of temperatures well known in the ceramics industry.) The cut tiles 14 are laid flat, do not touch other tiles and are not flipped or rotated during this process. Depending upon the look desired, the cut tiles 14 may or may not have a surface treatment 16 (Reference FIG. 6) such as a glaze, a stain, an oxide; or a slip. This is discussed in more detail herein.

Clay undergoes two basic stages in firing; dehydration and vitrification. In a kiln, with the rising temperature, the excess absorbed interlayer water molecules as well as the adsorbed interstitial water molecules (chemical water) are transported to the surface by capillary action. The absorbed interlayer water molecules are the first evaporated and at about 660° F.

the chemical water, which cannot be removed by any amount of drying below that temperature, begins to be driven off. The dehydration process is essentially complete at about 1100° F. and the clay becomes anhydrous, or free of all water. Beyond this point incipient sintering begins; the molecules of silica and alumina begin to collapse together, partially filling the voids left by the evaporated water and creating a relatively firm bond which gives the fired clay body its hardness and strength. At temperatures above 1100° F., the clay body loses it's structure becoming "amorphous". By this time all organic impurities, (termed Loss on Ignition or LOI products) are driven out. Recrystallization may occur at temperatures above 1832° F. Once above 1832° F. the clay reaches a temperature which is above its stability range and the minerals may not have time to alter and recrystallize instead becoming fused into an amorphous solid. This "vitrified," or glassy solid is not absorbent and can never return to its original plastic state. Refractory brick or tile must have a minimum fusion point higher than 1,600° F.

During dehydration the water is driven off. For this specific clay composition forming the refractory tile, this amounts to about 8% shrinkage although most pottery and clay based firings undergo about 14% shrinkage.

The firing process requires an approximately 8 and ½ hour firing. (Reflected in Table 1 and FIG. 13) While the heatup rate may be compressed to as low as approximately 3 hours, (reflected in Table 2) any quicker heating may result in explosion.

TABLE 1

Heatup Rates for 8.5 Hour Firing

| Temperature (F. °) | Time (Hours) |
| --- | --- |
| 65 | 0 |
| 250 | 1.2 |
| 1000 | 2.7 |
| 1150 | 3.6 |
| 1694 | 5.4 |
| 1946 | 7.5 |
| 2276 | 8.5 |

The critical feature is the end temperature achieved. This attains a level of vitrification that imparts the desired refractory qualities to the tiles. The tiles are removed when they are less than 100° F. but this is for handling purposes only as they may be removed after the critical temperature has been reached. It should be noted that most modern kilns are computer controlled and have various preset heatup rates. While these vary between manufacturers, there are industry known limitations in the approach to final temperature. While the depicted heatup rate is representative of the inventor's kiln, it is not the precise interval heatup rates that are critical but rather the overall heatup rate as indicated by the slope of the temperature vs time line.

TABLE 2

Heatup Rates for 3.0 Hour Firing

| Temperature (F. °) | Time (Hours) |
| --- | --- |
| 650 | 0 |
| 250 | 0.4 |
| 1000 | 1.0 |
| 1150 | 1.3 |
| 1694 | 1.9 |

TABLE 2-continued

Heatup Rates for 3.0 Hour Firing

| Temperature (F. °) | Time (Hours) |
| --- | --- |
| 1946 | 2.7 |
| 2276 | 3.0 |

A typical approach to final temperature as used in the aforementioned process would be accomplished at the following rates: 200° F. per hour from ambient to 250° F.; 400° F. per hour from 250° F. to 1000° F.; 180° F. per hour from 1000° F. to 1150° F.; 300° F. per hour from 1150 to 1694° F.; and 120° F. per hour from 1694° F. to 2273° F.

Figure 9:
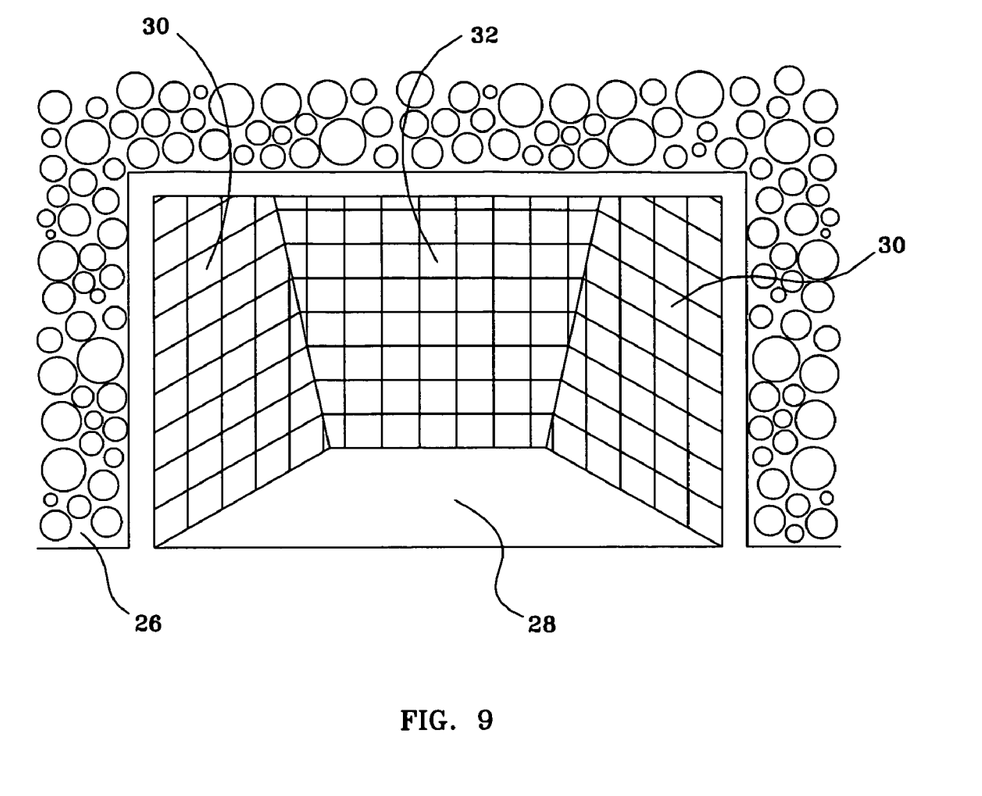
FIG. 9 is a front view of a fireplace with an array of decorative refractory tile applied to the back and side walls of the firebox.

Once cooled, the tiles 14 may be applied in the firebox area (Reference FIG. 9) of a fireplace 26, on the side walls 30, back walls 32 or floor 28 in the same manner in which ceramic wall tiles are set, except for the bonding and grouting agents. A wet, air setting high strength mortar for temperatures up to 3000° F. must be used to set the tiles. Sairmix 7A manufactured by RHI Refractories has been tested satisfactorily for this application and found to perform satisfactorily in accordance to the below described procedures. Such products generally require 24 hours to dry. Similarly, a wet, air setting, thick patching mortar for temperatures up to 3200° F. may be used as a grout. It must have excellent bonding capabilities as well as low shrinkage and able to span up to ½ inch wide joints 34. (Reference FIG. 12) Greenpatch 421 from RHI Refractories has been tested and found to perform satisfactorily in accordance to the below described procedures. Such products generally require 24 hours to dry.

Figure 8:
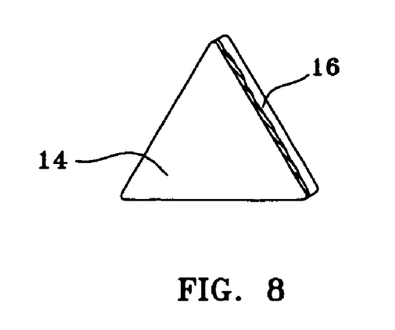
FIG. 8 is an side view of a geometric shaped tile with a fused surface coating.

A cool unglazed tile, once removed from the kiln, is naturally slightly porous. The purpose of a surface treatment 16 is threefold: to prevent porosity, to resist chemical action, and to color. A surface treatment can be added in any of the following ways: by glazing; by staining; by surface application of an oxide; or by surface application of a slip. (A slip is a thin coat of finely ground up naturally colored clay that has been diluted to a paint like working consistency with water.) All of these surface treatments when undergoing a firing, are fused to the refractory tile forming a vitrified, either glass like or matte surface finish. All but the glazes generally are applied to the final visual surfaces of the cut, wet tiles 14 with a brush 32 (Reference FIGS. 6 and 8) before the first firing. For best results, glazes need to be applied to the cooled refractory tiles and then the tiles fired in the kiln a second time to properly fuse the glaze to the tile. Although it is possible under controlled conditions to apply a glaze prior to the first firing of the tiles, it often results in a crazed finish or a finish replete with hairline cracks and non uniform color depth. These surface treatments often include glass to begin with, in a finely powdered state; or the fused components of glass. Sometimes they are merely the alkaline or metallic-salt part of glass, which finds its silica in the clay of the tile itself.

In the absence of any ASTM testing procedures, two separate thermal shock tests were devised and utilized in the development of the refractory tile. Experimentation has proven that the method outlined above will result in a refractory tile between 3/16 inch and ½ inch thick that can successfully withstand both of the thermal shock tests detailed below without damage:

Thermal Shock Test #1

Raise the tile temperature from ambient 70° F. to 1500° F. in 15 minutes in an electric or gas fired kiln.

Hold tile temperature at 1500° F. for 15 minutes.

Remove tile from kiln and quench immediately in 60° F. water.

Immediately repeat with same tile for 4 more cycles.

Inspect for damage.

Thermal Shock Test #1

Place the tile in an enclosed hardwood burning firebox having a temperature of 1200° F.

Keep tile in this environment for 20 minutes.

Remove tile from firebox and quench immediately in 60° F. water.

Place quenched tile immediately in a freezer for 8 hours.

Immediately repeat with same tile for 2 more cycles.

Inspect for damage.

When the aforementioned clay body is fired as detailed above and the desired surface treat applied, it renders a decorative refractory tile that is capable of withstanding thermal cycling with temperatures up to 2000° F. as well as the harsh environment of a firebox.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed.

Having thus described the invention, what is claimed as new and desired to be secured by Letters Patent is as follows:

1. A refractory tile made from at least a three (3) hour long, high temperature firing of a clay body having the following dry clay base composition:
   0.76 to 0.84% by weight Sodium Oxide ($Na_2O$);
   1.06-1.18% by weight Potassium Oxide ($K_2O$);
   0.14-0.16% by weight Magnesium Oxide (MgO);
   0.15-0.19% by weight Calcium Oxide (CaO);
   27.09-29.95% by weight Aluminum Oxide ($Al_2O_3$);
   1.05-1.17% by weight Ferric Oxide ($Fe_2O_3$);
   63.46-70.14% by weight Silicon Dioxide ($SiO_2$);
   0.75-0.83% by weight Titanium Dioxide ($TiO_2$);
   0.019-0.021% by weight Phosphorus Pentoxide ($P_2O_5$); and
   0.50-0.56% by weight Organic material.

2. The refractory tile of claim 1 wherein said clay body consists of said dry clay base blended uniformly with a minimum of 20% by weight of the total dry clay base of water.

3. The refractory tile of claim 2 wherein said firing reaches a final temperature between 2228° F. and 2273° F.

4. The refractory tile of claim 3 wherein said firing takes eight and one half (8.5) hours to reach said final temperature.

5. The refractory tile of claim 4 wherein said firing reaches said final temperature at the following rates;
   200° F. per hour from ambient to 250° F.;
   400° F. per hour from 250° F. to 1000° F.;
   180° F. per hour from 1000° F. to 1150° F.;
   300° F. per hour from 1150 to 1694° F.; and
   120° F. per hour from 1694° F. to 2273° F.

6. The refractory tile of claim 1 wherein said firing takes approximately eight and one half hours to reach a final firing temperature.

7. A process of aesthetically improving a fireplace according to the following steps:
   fabricating decorative refractory tiles made from clay by thoroughly mixing the following components to form a clay body:
   0.76 to 0.84% by weight Sodium Oxide ($Na_2O$);
   1.06-1.18% by weight Potassium Oxide ($K_2O$);
   0.14-0.16% by weight Magnesium Oxide (MgO);
   0.15-0.17% by weight Calcium Oxide (CaO);
   27.10-29.95% by weight Aluminum Oxide ($Al_2O$);
   1.05-1.17% by weight Ferric Oxide ($Fe_2O_3$);
   63.46-70.14% by weight Silicon Dioxide ($SiO_2$);
   0.75-0.83% by weight Titanium Dioxide ($TiO_2$);
   0.019-0.021% by weight Phosphorus Pentoxide($P_2O_5$);
   0.50-0.56% by weight Organic material; and water making up a minimum of 20% by weight of the total component weight,
   flattening said clay body into a planar form having a thickness between ⅝ and ½ of an inch;
   cutting shaped tiles from said planar form;
   firing said shaped tiles in a kiln with an increasing temperature rise of between 120° F. and 400° F. per hour for a approximately eight and one half (8.5) hours reaching a final temperature of between 2228° F. and 2273° F.;
   allowing said fired tiles to cool;
   setting the fired tiles to the interior surfaces of a fireplace to form a spaced, aesthetically appealing pattern with a wet, air setting high strength mortar adapted for use in temperatures over to 2000° F.;
   grouting said spaces in the pattern with a wet, air setting, thick patching mortar adapted for use with temperatures exceeding 2000° F.

8. The process of aesthetically improving a fireplace of claim 7 further comprising an additional step of radiusing all edges of said cut shaped tiles before the firing.

9. The process of aesthetically improving a fireplace of claim 8 further comprising an additional step of applying a surface treatment onto said cut shaped tiles before the firing wherein said surface treatment is selected from the group consisting of glazes, slips, oxides and stains.

10. The process of aesthetically improving a fireplace of claim 8 further comprising an additional step of applying a glaze surface treatment onto said fired tiles and firing the glazed tile a second time at a temperature and time recommended by the glaze manufacturer.

11. A decorative refractory product made from at least a 3 hour firing of a clay body reaching a final temperature of between 2228° F. and 2273° F., wherein said clay body, when fired, has the following chemical composition within a 5% tolerance for each component:
   0.805% by weight Sodium Oxide (Soda);
   1.12% by weight Potassium Oxide (Potash);
   0.15% by weight Magnesium Oxide (Magnesia);
   0.16% by weight Calcium Oxide (Quicklime);
   28.52% by weight Aluminum Oxide (Alumina);
   1.11% by weight Ferric Oxide (Iron);
   66.8% by weight Silicon Dioxide (Silica);
   0.79% by weight Titanium Dioxide (Titania); and
   0.02% by weight Phosphorus Pentoxide.

12. The decorative refractory product of claim 11 wherein said final temperature is reached after an eight (8) hour firing through the following temperature increments:
   200° F. per hour from ambient to 250° F.;
   400° F. per hour from 250° F. to 1000° F.;
   180° F. per hour from 1000° F. to 1150° F.;
   300° F. per hour from 1150 to 1694° F.; and
   120° F. per hour from 1694° F. to 2273° F.

* * * * *